United States Patent [19]

Beery

[11] Patent Number: 5,566,644
[45] Date of Patent: Oct. 22, 1996

[54] BALL SCREW POWER DRIVE FOR VENTILATION CURTAINS

[75] Inventor: Neil D. Beery, Harrisonburg, Va.

[73] Assignee: AGRI Ventilation Systems, Inc., Dayton, Va.

[21] Appl. No.: 274,403

[22] Filed: Jul. 13, 1994

Related U.S. Application Data

[63] Continuation-in-part of Ser. No. 180,374, Jan. 12, 1994, abandoned.

[51] Int. Cl.$^6$ ............................................. A01K 1/00
[52] U.S. Cl. ............................................. 119/448
[58] Field of Search ............................... 119/22, 436, 437, 119/448

[56] References Cited

U.S. PATENT DOCUMENTS

| | | |
|---|---|---|
| 3,018,759 | 1/1962 | Helbig . |
| 3,042,001 | 7/1962 | Dubie et al. . |
| 3,429,298 | 2/1969 | Thomason ............................ 119/22 |
| 3,669,350 | 6/1972 | White . |
| 3,951,336 | 4/1976 | Miller et al. . |
| 4,241,871 | 12/1980 | Newell, III . |
| 4,832,260 | 5/1989 | Spilde . |
| 5,031,574 | 7/1991 | McDowell . |
| 5,119,762 | 6/1992 | Yockey et al. . |

*Primary Examiner*—Gene Mancene
*Assistant Examiner*—Thomas Price
*Attorney, Agent, or Firm*—Jones, Tullar & Cooper, P.C.

[57] ABSTRACT

A drive for opening and closing air flow control devices, such as ventilation curtains, in a poultry house or the like includes a ball screw drive which is automatically disengaged during a power failure to allow the air flow control devices to drop open partially or fully. Upon restoration of power, the air flow control device is automatically restored to a set position. A digital controller receives inputs from a thermostat and/or pressure sensor which cause periodic actuation of a gear motor that rotates the ball screw and thereby moves a block to which one or more ventilation curtains are attached by means of lifting cables. An electromagnetically actuated brake is attached to the motor which holds its output shaft in position during normal operation. Upon occurrence of a power failure, the brake is deenergized so that the output shaft of the motor, and therefore the ball screw, are allowed to rotate freely, thereby allowing the ventilation curtains to drop to a partially opened position under the force of gravity. Alternatively, an electromagnetic clutch is placed between the motor shaft and the ball screw which disengages upon the occurrence of a power failure, and allows the ventilation curtains to drop open a substantial amount by decoupling the motor, which has inherent frictional resistance, from the ball screw. The use of the ball screw drive in conjunction with a heavy duty thrust bearing positioned between the ball screw and the motor provides a greatly increased lifting capacity over prior art power drives.

21 Claims, 2 Drawing Sheets

BALL SCREW POWER DRIVE FOR VENTILATION CURTAINS

REFERENCE TO RELATED APPLICATION

This application is a continuation-in-part of patent application Ser. No. 08/180,374, filed Jan. 12, 1994, now abandoned.

BACKGROUND OF THE INVENTION

The present invention relates to a ball screw power drive which is preferably employed for raising and lowering ventilation curtains or other air flow control devices in poultry houses, or the like.

Poultry houses, other animal houses and greenhouses often employ ventilation systems which include very large curtains that are selectively raised and lowered to control air flow through the house. These curtains are usually thermostatically controlled so that their position is automatically adjusted in an effort to maintain the temperature in the house within a desired range. It is very important that the temperature in the house be maintained within a desired range, especially in the case of poultry houses because poultry is very sensitive to temperature extremes, particularly elevated temperatures which occur in the summer months.

Power failures in a poultry house pose a significant problem in this regard. In particular, if a power failure occurs during a very hot day, the ventilation system will shut off and the chickens will be quickly exposed to elevated temperatures which can result in death, often within a very short period of time, for example, fifteen minutes. This problem is compounded by the fact that prior art curtain power drives work in such a manner that the curtains will be fixed in their previously set position upon the occurrence of a power failure, unless various configurations of expensive supplemental equipment are installed. If the curtains happen to be in a position which substantially impedes air flow through the poultry house when a power failure occurs, the temperature in the house will increase to a dangerous level substantially faster than would occur if the curtains are fully, or nearly fully, open.

To remedy this problem, prior art curtain drives provide a means by which the curtains can be manually opened upon the occurrence of a power failure. This solution is not completely satisfactory, however, because not only does it require a quick detection and response on the part of the poultry house employees, but also requires that the curtains be manually reengaged with the automatic drive mechanism when power is restored.

Another drawback with prior art curtain power drives is that they typically employ a drive mechanism which cannot adequately handle heavy loads. The ventilation curtains employed in poultry houses are usually very large, ranging anywhere between four hundred and nine hundred feet long, and typically require a five thousand pound lifting force to be moved from an open to a closed position. Although numerous types of drive mechanisms, such as spin drives and acme screw drives, have been employed in the past in ventilation curtain power drives, none of these have been completely satisfactory from a load strength standpoint.

SUMMARY OF THE INVENTION

The present invention seeks to overcome the drawbacks of the prior art discussed above by providing a power drive for ventilation curtains or other air flow control devices which responds to a power failure by allowing the curtains or air flow control devices to partially or fully open automatically, and which also automatically resets the curtains or air flow control devices to their operating position upon power restoration. In addition, the present invention provides a power drive which is considerably stronger than prior art power drives, and enables a single drive to be employed for opening and closing more than one side of ventilation curtains.

More particularly, the present invention employs a motor driven ball screw which moves a metal block, to which is attached one or more curtain lifting cables, between two limiting positions, one in which the curtain is fully opened, and the other in which the curtain is fully closed. A motor is employed to drive the ball screw and is thermostatically controlled using either digital or solid state electronics so that the curtain position is periodically adjusted in steps until a desired temperature is reached in the house.

An electromagnetically actuated brake mechanism is attached to the motor which holds the motor shaft in position when it is not running during normal power conditions, but automatically releases the shaft upon the occurrence of a power failure so that the weight of the ventilation curtain will allow it to drop partially open automatically. In a modified form of the invention, an electromagnetic clutch is disposed between the motor and the ball screw which disengages upon a power failure and allows the curtain to drop substantially open. As soon as power is restored, the motor controller will again adjust the position of the curtain incrementally until the temperature in the house is within the range called for by the thermostat. In the above manner, the drive mechanism for the curtains not only causes the curtains to open automatically upon the occurrence of a power failure, but also properly repositions the curtains once power is restored.

The use of the ball screw drive is also advantageous in that this type of drive is much stronger than other types of drives, such as spin drives and acme screw drives, and can therefore better withstand the heavy loads imposed upon it by the ventilation curtains. In addition, a heavy duty thrust bearing is incorporated in the mechanism between the motor and the ball screw which further increases the lifting capacity of the drive mechanism.

BRIEF DESCRIPTION OF THE DRAWINGS

The numerous advantages and features of the present invention will become apparent from a more detailed description of a preferred embodiment thereof, taken in conjunction with the accompanying drawing figures in which.

DETAILED DESCRIPTION OF THE PREFERRED EMBODIMENTS

Figure 1:
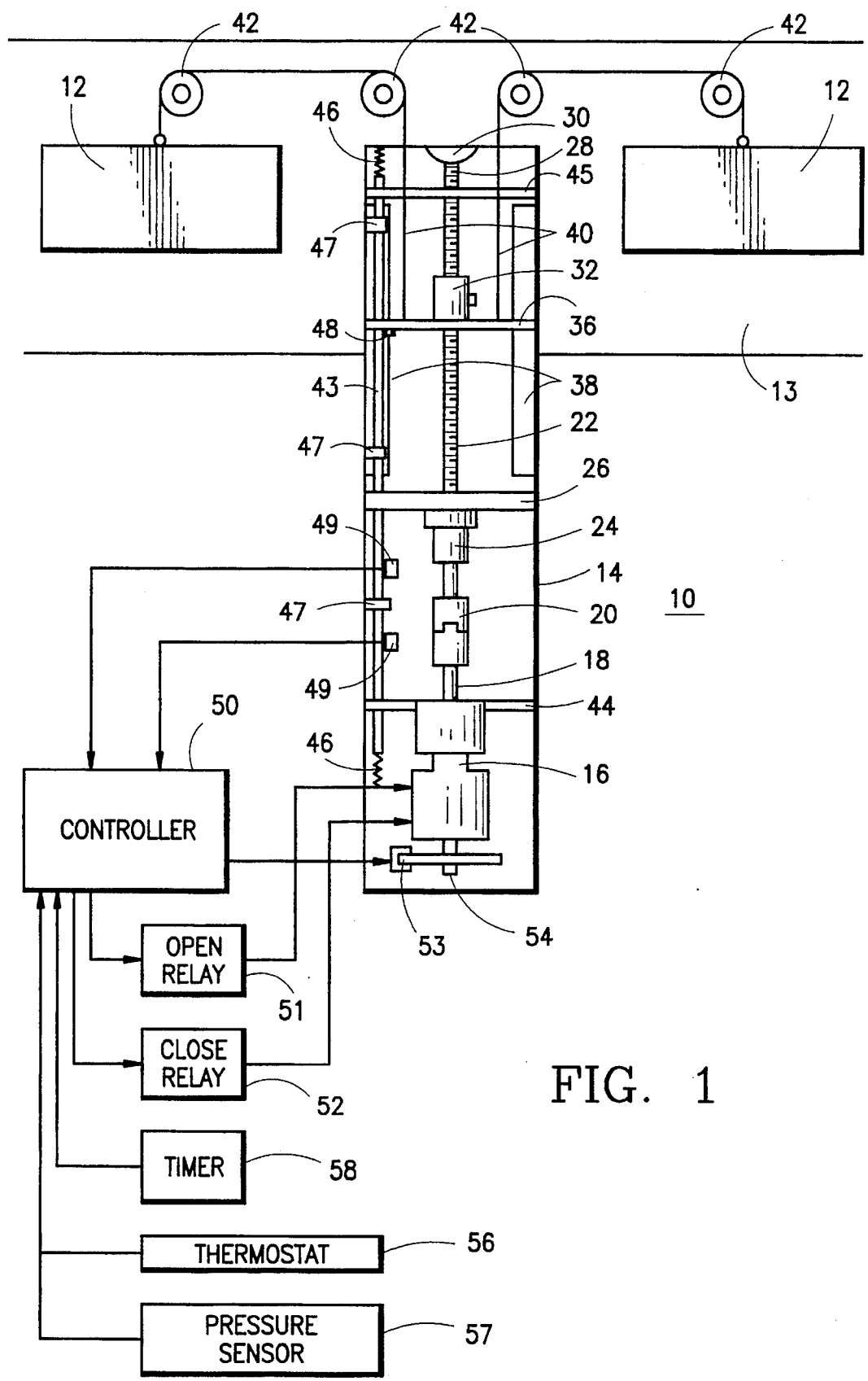
FIG. 1, which is a schematic illustration of a ventilation curtain or other air flow control device power drive constructed in accordance with a preferred embodiment of the present invention; and, FIG. 2 is a schematic illustration of a modification of the power drive of FIG. 1 which employs an electromagnetic clutch.

With reference to FIG. 1, a ventilation curtain power drive 10 is illustrated which is employed for adjusting the position of one or more ventilation curtains or other air flow control devices 12 in a poultry house or the like 13 (both schematically illustrated). Although the power drive 10 is designed particularly for use with ventilation curtains, it will be understood that it can also be employed with any other type of air flow control device, such as adjustable vents, flappers or air valves. The drive 10 includes a number of mechanical drive elements that are contained within an elongated box type housing 14, which is preferably made from metal, such as galvanized steel. These mechanical drive elements include a gear motor 16 having an output shaft 18 connected through a star joint type coupling 20 to a long ball screw 22, all of these elements being conventional.

To absorb the tremendous load imparted by the curtains 12, a heavy duty (e.g., 11,000 lbs.) thrust bearing 24 is positioned between the coupling 20 and the ball screw 22 and is fixed to a metal bracket 26, which in turn is fixed within the housing 14.

A top end 28 of the ball screw 22 is held in a conventional sleeve bearing 30 which is also mounted within the housing 14. A conventional ball nut 32 is positioned on the ball screw 22 and is fixedly attached to an apertured metal block 36 which is movable along the length of the ball screw 22. As is conventional, the ball nut 32 contains a plurality of loose ball bearings (not shown) which ride in the threads of the ball screw 22 and cause translational movement of the metal block 36 when the ball screw 22 is rotated by the gear motor 16. A plurality of low friction plastic guide strips 38 are preferably mounted within the housing 14 to provide a low friction sliding surface for the metal block 36.

Attached to the movable metal block 36 by any suitable means are one or more lifting cables 40 which are threaded around a plurality of pulley wheels 42 and have their opposite ends connected to the curtains 12 so that movement of the metal block 36 along the ball screw 22 will result in corresponding movement of the curtains 12 between an open and a closed position.

A quarter inch square guide rod 43 is positioned near the left side of the housing 14 which passes through apertures in the moveable metal block 36, the metal bracket 26 and two additional brackets 44 and 45. The rod 43 is elastically held in position by a pair of coil springs 46, one positioned at each end of the rod 43 and fixed to the housing 14. A set of three lock nuts 47 are fixed to the guide rod 43 along its length and are positioned so that the top one of them will be engaged by a tab 48 on the metal block 36 when the metal block 36 reaches its uppermost position corresponding to the curtains 12 being fully opened, and the middle one of the lock nuts 47 will be engaged by the tab 48 when the block 36 reaches its lowermost position corresponding to the curtains 12 being fully closed. The bottom one of the lock nuts 47 is positioned between a pair of limit switches 49 which are affixed to the housing 14, each of which generates an output signal when the bottom lock nut 47 engages them.

The purpose of the guide rod 43 and its associated elements is to generate electrical signals when the power drive 10 has reached either of the two extremes of position in which the curtains 12 are either fully opened or fully closed. This is accomplished in the following manner. The two topmost lock nuts 47 are positioned along the guide rod 43 in such a manner that when they are engaged by the tab 48 on the moveable metal block 36, they will cause the rod 43 to move either up or down, as the case may be, against the bias of the springs 46. This movement of the rod 43 will in turn cause the bottommost of the lock nuts 47 to move and engage the bottom or the top limit switch 49. The engaged one of the limit switches 49 will then generate an electrical signal indicating that the metal block 36 has reached its uppermost or lowermost position, these positions corresponding to the curtains 12 being fully opened or fully closed, respectively.

To control the operation of the gear motor 16 automatically in response to temperature variations in the poultry house, a controller 50, preferably digital, is connected to a pair of motor control relays 51 and 52 of the motor 16, one for opening and one for closing the curtains 12, and controls starting, stopping and reversing of the motor 16 in accordance with a number of input signals as discussed below. It will be understood that the controller 50 can also be implemented using conventional solid state electronics, although microprocessor based digital control circuitry is preferred because it does not require the use of a separate timer and can be easily programmed for any desired control strategy. An electromagnetically actuated brake 53 is attached to an input shaft 54 of the motor 16 which is also controlled by the controller 50. The electromagnetic brake 53 can be any suitable conventional clutch/brake mechanism such as those sold by Warner Electric Brake and Clutch Division of South Beloit, Ill. Under normal operating conditions, the controller 50 supplies power to the brake 53 in a manner so that the input shaft 54 of the motor 16 will be held in a fixed position when the motor 16 is not operating. If a power failure occurs, the controller 50 will no longer power the brake 53, thereby releasing the input shaft 54 so that the motor's output shaft 18 can freely rotate.

The controller 50 receives inputs from a thermostat 56, a static pressure sensor 57, or other control device contained within the poultry or other house, a timer 58 (typically an integral part of the controller circuitry) and the limit switches 49. The inputs from the thermostat 56, pressure sensor 57 and timer 58 cause the electronic controller 50 to actuate the gear motor 16 in the following manner. Periodically, such as every one minute for example, the controller 50 checks the inputs from the thermostat 56 and pressure sensor 57 to determine if the temperature and pressure within the poultry house are within the desired range. If they are, no action will be taken. On the other hand, if the temperature and/or pressure is no longer within the desired range, the controller 50 causes actuation of the motor 16 to either open or close the curtains 12 as necessary to change the temperature and/or pressure in the poultry house. The controller 50 does this by actuating the motor 16 for a brief interval, e.g. 10 seconds, so that the curtains 12 are moved incrementally. For example, the curtains may be moved one inch during each operating interval of the motor 16. The controller 50 will then wait a short period of time, such as one minute, and then once again check the status of the thermostat 56 and pressure sensor 57. This procedure continues until either the thermostat 56 and/or pressure sensor 57 indicates that the proper temperature and/or pressure has been attained in the poultry house or the fully opened or closed curtain position is attained. The inputs from the limit switches 49 are employed to provide an indication to the controller 50 that the fully opened or fully closed curtain positions have been attained so that only operation of the motor in the opposite direction will be permitted at that point.

If a power failure should occur during operation of the ventilation curtain drive mechanism 10, the electromagnetically actuated brake 53 will automatically disengage so that the output shaft 18 of the motor 16 will rotate freely, which in turn allows the ball screw 22 to rotate freely also. As is conventional, the curtains 12 are placed in the poultry house 13 so that they fold open from the top to the bottom, and their very substantial weight will therefore allow them to open partially (e.g., between 2 and 6 inches, plus or minus)

when the ball screw 22 is allowed to rotate freely upon release of the brake 53. In most cases, the internal mechanical friction in the motor 16 prevents the curtains 12 from dropping open fully upon release of the brake 53. However, in colder climates, this partial opening provides some ventilation relief in the poultry house during a power failure. Once power is restored, the controller 50 will reapply power to the brake 53 and motor 16, thereby once again causing automatic periodic actuation of the gear motor 16 in response to the inputs from the thermostat 56, pressure sensor 57 or other control device so that the curtains 12 will be automatically moved to their operating position.

Figure 2:
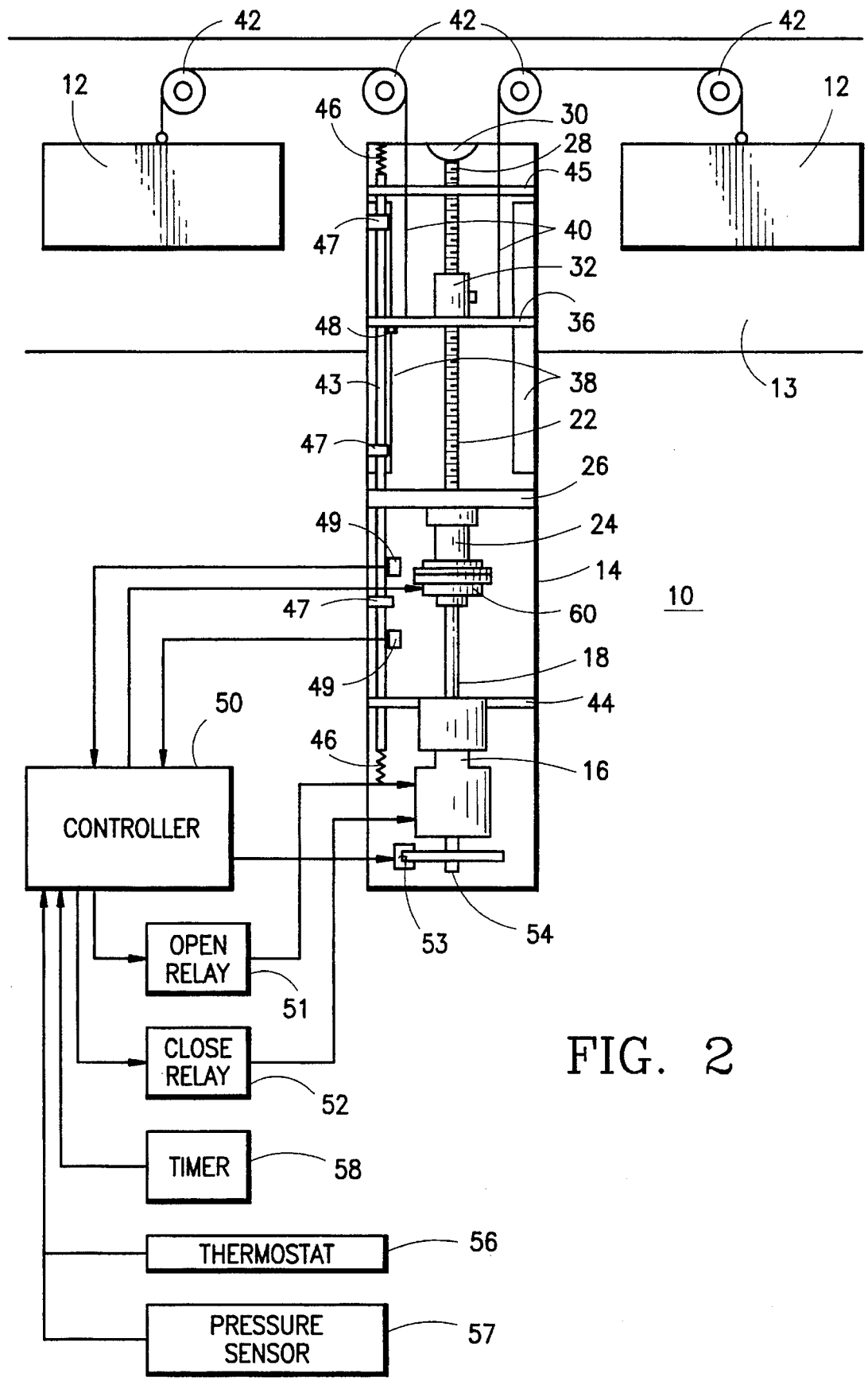

FIG. 2 illustrates a modified version of the power drive mechanism 10 of FIG. 1 that is particularly useful in hotter climates where typical daytime summer temperatures exceed desirable temperatures. In this modified version, known as the power fail option version, the star joint type coupling 20 is replaced by a conventional electromagnetic clutch 60 which, as with the electromagnetic brake 53, can be any suitable conventional clutch mechanism such as those sold by Warner Electric Brake and Clutch Division. The electromagnetic clutch 60 is electrically connected to the controller 50 which supplies a DC voltage thereto any time that the controller 50 is operating. If a power failure occurs, the controller 50 will no longer be able to supply a voltage to the electromagnetic clutch 60, whereby the clutch will be deactivated thus enabling the ball screw 22 to rotate independently of the motor 16. In this condition, the weight of the curtains or other air flow control devices 12 easily overcomes any frictional forces in the ball screw 22 and ball nut 32 so that the curtains 12 will drop open. This provides additional ventilation in the poultry house during a power failure which, on a hot summer day, may extend the period of time before a dangerous temperature level is reached by as much as an hour or more. Again, once power is restored, the controller 50 will reapply power to the motor 16, brake 53 and electromagnetic clutch 60, and will once again cause automatic periodic actuation of the gear motor 16 in response to the inputs from the thermostat 56, pressure sensor 57 or other control device so that the curtains or other air flow control devices 12 will be automatically moved to their proper position.

Although the invention has been disclosed in terms of a preferred embodiment and a modification thereof, it will be understood that numerous other modifications could be made thereto without departing from the scope of the invention as defined in the following claims.

What is claimed is:

1. A power drive comprising:

a motor having an output shaft;

brake means connected to said motor for stopping said output shaft and holding it in a fixed position;

screw drive means attached to said output shaft, said screw drive means including a linearly moveable element moveable between first and second positions;

means for connecting said moveable element to an air flow control device to be opened and closed; and, controller means for actuating said motor and said brake means to selectively move said linearly moveable element.

2. The power drive of claim 1 wherein said controller means further includes means for applying power to said brake means to hold said output shaft, and therefore said linear moveable element and an air flow control device connected thereto, in a fixed position, and means for automatically disengaging said brake means upon the occurrence of an interruption of power to said controller means to allow an air flow control device connected to said movable element to move toward an opened position by the force of gravity.

3. The power drive of claim 2 further including environmental condition sensing means connected to said controller means, wherein said controller means selectively actuates said motor in response to signals received from said condition sensing means, whereby the resulting position of said movable element, and an air flow control device connected thereto, is directly related to the value of the environmental condition sensed by said condition sensing means.

4. The power drive of claim 3 wherein said controller means further includes means for periodically checking said condition sensing means and incrementally actuating said motor in response to signals received from said condition sensing means, wherein the position of said moveable element, and an air flow control device connected thereto is periodically incrementally adjusted until either a desired value is sensed by said condition sensing means or an air flow control device is moved to either of its fully opened or fully closed positions.

5. The power drive of claim 1, further including an air flow control device connected to said means for connecting said movable element, said air flow control device being movable between a fully opened and a fully closed position, and being biased toward an opened position by the force of gravity.

6. The power drive of claim 5, wherein said air flow control device comprises a ventilation curtain.

7. The power drive of claim 1 wherein said screw drive includes a ball screw connected to said output shaft and a ball nut disposed on said ball screw and attached to said moveable element.

8. The power drive of claim 7 further including a heavy duty thrust bearing positioned between said ball screw and said output shaft.

9. The power drive of claim 8, further including at least first and second air flow control devices connected to said means for connecting said moveable element.

10. The power drive of claim 9, wherein said air flow control devices comprise first and second ventilation curtains.

11. A power drive comprising:

a motor having an output shaft;

screw drive means including a linearly moveable element moveable between first and second positions;

an electromagnetic clutch disposed between said output shaft and said screw drive means for selectively connecting said output shaft to said screw drive means;

means for connecting said moveable element to at least one air flow control device to be opened and closed; and, controller means for actuating said motor and said electromagnetic clutch to selectively move said linearly moveable element.

12. The power drive of claim 11, wherein said controller means further includes means for applying power to said electromagnetic clutch during normal operation to connect said output shaft to said screw drive means, and means for automatically disengaging said electromagnetic clutch upon the occurrence of an interruption of power to said power drive to allow an air flow control device connected to said movable element to drop to an opened position by the force of gravity.

13. The power drive of claim 12 further including environmental condition sensing means connected to said controller means, wherein said controller means further includes means for selectively actuating said motor in response to signals received from said condition sensing means, whereby the resulting position of said movable element, and an air flow control device connected thereto is directly related to the value of the environmental condition sensed by said condition sensing means.

14. The power drive of claim 13 wherein said controller means further includes means for periodically checking said condition sensing means and incrementally actuating said motor in response to signals received from said condition sensing means, wherein the position of said movable element, and an air flow control device connected thereto is periodically incrementally adjusted until either a desired value is sensed by said condition sensing means or an air flow control device is moved to either of its fully opened or fully closed positions.

15. The power drive of claim 12, further including brake means connected to said motor, said brake means being selectively actuatable by said controller means to hold said output shaft, and therefore said linear moveable element and an air flow control device in a fixed position.

16. The power drive of claim 11 wherein said screw drive includes a ball screw connected to said output shaft and a ball nut disposed on said ball screw and attached to said moveable element.

17. The power drive of claim 16 further including a heavy duty thrust bearing positioned between said ball screw and said output shaft.

18. The power drive of claim 17, further including at least first and second air flow control devices connected to said means for connecting said moveable element.

19. The power drive of claim 18, wherein said air flow control devices comprise first and second ventilation curtains.

20. The power drive of claim 11, further including an air flow control device connected to said means for connecting said movable element, said air flow control device being movable between a fully opened and a fully closed position, and being biased toward an opened position by the force of gravity.

21. The power drive of claim 20, wherein said air flow control device comprises at least one ventilation curtain.

* * * * *